United States Patent
Aebi

(10) Patent No.: US 7,433,453 B2
(45) Date of Patent: Oct. 7, 2008

(54) METHOD AND SYSTEM FOR TRANSMITTING USEFUL DATA BETWEEN TELECOMMUNICATION DEVICES

(75) Inventor: Paul Aebi, Muenchringen (CH)

(73) Assignee: Swisscom Mobile AG, Bern (CH)

( * ) Notice: Subject to any disclaimer, the term of this patent is extended or adjusted under 35 U.S.C. 154(b) by 302 days.

(21) Appl. No.: 10/585,636

(22) PCT Filed: Jan. 24, 2005

(86) PCT No.: PCT/EP2005/050295

§ 371 (c)(1), (2), (4) Date: Jul. 11, 2006

(87) PCT Pub. No.: WO2005/074310

PCT Pub. Date: Aug. 11, 2005

(65) Prior Publication Data

US 2008/0137826 A1    Jun. 12, 2008

(30) Foreign Application Priority Data

Jan. 29, 2004    (EP)  ................................... 04100328

(51) Int. Cl.
*H04M 15/00* (2006.01)
*H04M 11/00* (2006.01)

(52) U.S. Cl. ............................... 379/114.2; 379/114.16; 455/407; 455/408; 713/168; 713/171

(58) Field of Classification Search ............ 379/114.01, 379/114.14, 114.16, 114.17, 114.2, 121.01, 379/130, 144.04, 144.06, 144.01; 455/405, 455/406, 407, 408, 411, 558; 713/162, 164, 713/168, 171
See application file for complete search history.

(56) References Cited

U.S. PATENT DOCUMENTS

| | | | | |
|---|---|---|---|---|
| 5,915,226 A * | 6/1999 | Martineau | | 455/558 |
| 6,332,579 B1 | 12/2001 | Ritter | | |
| 6,415,142 B1 | 7/2002 | Martineau | | |
| 6,741,848 B2 * | 5/2004 | Timonen et al. | | 455/405 |
| 7,127,231 B2 * | 10/2006 | Herzog | | 455/406 |

(Continued)

FOREIGN PATENT DOCUMENTS

DE     100 39 434 A 1     2/2002

(Continued)

OTHER PUBLICATIONS

"Wireless Identity Module, Part: Security, Version Jul. 12, 2001, Wireless Application Protocol WAP-260-WIM-20010712-A," XP-002247392, Jul. 12, 2001, pp. 1-105.

*Primary Examiner*—Binh K Tieu
(74) *Attorney, Agent, or Firm*—Oblon, Spivak, McClelland, Maier & Neustadt, P.C.

(57) ABSTRACT

A method and system for transmitting service data between telecommunication devices. Pre-paid access data including a first digital key and control data is stored in a memory module of a telecommunication device, a second digital key being stored on one or more control units of the telecommunication network. A validity criterion is determined based on the control data, and service data of the first telecommunication device is encoded by the first key as long as the validity criterion is fulfilled. The encoded service data is transmitted to the control unit, decoded by the second digital key, and transmitted to another telecommunication device.

10 Claims, 2 Drawing Sheets

U.S. PATENT DOCUMENTS

| | | | |
|---|---|---|---|
| 7,225,334 B2* | 5/2007 | Bianchi | 713/164 |
| 2003/0027549 A1* | 2/2003 | Kiel et al. | 455/405 |
| 2004/0210528 A1* | 10/2004 | Guion et al. | 705/40 |
| 2006/0189296 A1* | 8/2006 | Sevilla | 455/405 |
| 2006/0246872 A1* | 11/2006 | Tarkkala | 455/411 |
| 2007/0042755 A1* | 2/2007 | Singhal | 455/411 |

FOREIGN PATENT DOCUMENTS

| | | |
|---|---|---|
| DE | 101 26 939 A 1 | 12/2002 |
| WO | WO 99/46926 | 9/1999 |
| WO | WO 03/079713 A1 | 9/2003 |

* cited by examiner

METHOD AND SYSTEM FOR TRANSMITTING USEFUL DATA BETWEEN TELECOMMUNICATION DEVICES

TECHNICAL FIELD

This invention relates to a method and system for transmitting service data between telecommunication devices. The invention relates in particular to a method and system for transmission, on the basis of prepaid access data, of service data between telecommunication devices.

BACKGROUND ART

For transmission of service data between telecommunication devices, a service provider must set up and operate a network infrastructure. Operating mobile telephones with prepaid fees, i.e. in so-called prepaid mode, is known. With this type of operation, which, as a rule, does not require any subscription with a particular provider, the provider administers an accounting of charges which is identified by the calling line identification of the mobile telephone and, as a rule, through further identifiers, which are normally encrypted. The identifiers are stored at the provider and/or in the chip of the SIM card (Subscriber Identity Module), which must be present in the mobile telephone for the latter to be able to be operated for telecommunication. Such additional identifiers are certificates, for example, which confirm the authorization of the mobile telephone user, and are checked when establishing the connection. If the accounting of charges at the provider is supposed to be tracked in real time, then an updating must take place during a telephone call, for instance every second, based on the rate valid for the telephone call. This is in contrast to an accounting of charges in which calls are billed afterwards, and therefore the updating of the account of charges has to be carried out only at call end, for example. Mobile telephones in the prepaid mode can result in a very high technical investment for updating the account of charges.

Described in the German published patent application DE 100 39 434 A1 is a method for updating a counter of a terminal for accounting of charges. The counter is updated during a telephone call independently or according to control commands of the service provider at a certain clock pulse, and the authorization to use services is confirmed to the service provider at a certain clock pulse. In an embodiment, the counter is controlled or checked by the service provider by means of control commands. It is a drawback that the service provider needs a counter in order to check whether the certification for use of services was sent according to clock pulse. It is a further drawback that a corresponding counter image must be kept at the service provider in order to control the counter or to check the counter.

Known from the international patent application WO 03/079713 is a method of operation of mobile radio terminals in which WIM functionalities (Wireless Identification Module) are provided and billed, characterized in that the WIM is achieved internally, i.e. in the terminal or respectively in the SIM identification module located there. Each signature initiated by the participant is thereby counted internally, and, to be precise, back from a starting state, until the preset number of signatures is reached. The device is then blocked until a another signature count loading. Disadvantageous with this method is that, with the exception of blocking and release switches, the processing of the signature, i.e. of the digital data of the access rights, does not provide for any data processing and only performs a simple counting operation, without checking the volume of the digital data to be given a single signature, so that keeping service accounts at the provider is still necessary, it being necessary for a connection of the MSC (Mobile Switching Center) to the provider to be always established and maintained during a telephone call. During this step errors can occur, e.g. as a result of transmission interference or malfunction, so that the service accounts are able to be falsified. It is a further drawback that no volume-based billing is possible.

DISCLOSURE OF INVENTION

It is an object of the invention to propose a new method and system for transmitting service data between telecommunication devices not having the above-mentioned drawbacks of the state of the art. In particular, a simple, automated and economical method and system should be proposed which, in a completely general way, improves the security of the accounting of the service data and also the reliability of the processing of the digital data of the access rights, and moreover accelerates them.

This object is achieved according to the present invention through the elements of the independent claims. Further advantageous embodiments follow moreover from the dependent claims and from the specification.

These objects are achieved according to the invention in that a central module generates prepaid access data, the prepaid access data including a first digital key and control data, and the prepaid access data being stored in a memory module of the first telecommunication device, the central module generates a second digital key, assigned to the first digital key, the second digital key being stored on one or more control units of the telecommunication network, the first telecommunication device determines a validity criterion based on control data of the prepaid access data, and encodes service data of the first telecommunication device by means of the first key, as long as the validity criterion is fulfilled, and the first telecommunication device transmits encoded service data to the control unit, the control unit checking by means of the second digital key that the encoded service data are encoded with the first digital key, whereby, upon successful check, the control unit decoding the encoded service data, and the control unit transmitting the decoded service data to the second telecommunication device. The service data can consist of digitalized speech signals, for example, or any other data. The solution according to the invention has the advantage, among others, that for the billing of calls made in prepaid mode of a mobile radio device no accounting of charges of a central unit of the service provider has to be updated, in particular a volume-based billing is enabled, and the service provider remains informed at all times about the authorization to make a call.

In an embodiment variant, the prepaid access data stored in the memory module of the first telecommunication device are modified and/or deleted during the encoding of service data. This embodiment variant has the advantage, among others, that calls with a mobile radio device are able to be billed according to duration or data quantity, for example.

In another embodiment variant, the prepaid access data stored in the memory module of the first telecommunication device include a monetary amount value, this monetary amount value being modified and/or deleted during the encoding of service data. This embodiment variant has the advantage, among others, that the value of the stored prepaid access data is able to be shown to the user in a simple way, or stored prepaid access data are able to be transferred between telecommunication devices in a simple way.

In another embodiment variant, the prepaid access data are stored on an SIM module of the first telecommunication device. This embodiment variant has the advantage, among others, that the prepaid access data are storable in a memory area controllable by a service provider, or that prepaid access data are easily transferable between telecommunication devices by plugging the SIM into a different socket.

In an embodiment variant, the encoding of the service data includes a digital encryption and/or digital signature, and the decoding of the service data includes a corresponding digital decryption and/or verification of a digital signature. Such an embodiment variant has the advantage, among others, that widely distributed modules of telecommunication devices and control units for the encoding and decoding of service data are usable.

In an embodiment variant, the prepaid access data include an authorization for the encoding of a definable quantity of service data, the prepaid access data being deleted as soon as the encoding of the definable amount of service data has been completed. This embodiment variant has the advantage, among others, that prepaid access data are able to be administrated efficiently on the first telecommunication device.

In an embodiment variant, a multiplicity of blocks with prepaid access data are storable in the memory module of the first telecommunication device. This embodiment variant has the advantage, among others, that with failure of the validity criterion for the encoding of service data it is possible to switch over very efficiently to the next block with prepaid access data.

In an embodiment variant, the control data comprise a multiplicity of blocks, the determination of a validity criterion as well as the modification or deletion of the corresponding block of control data being feasible for each block. This embodiment variant has the advantage, among others, that the first digital key can be used repeatedly, and the memory requirement for storing the prepaid access data can be reduced.

It should be stated here that, besides the method according to the invention, the present invention also relates to a system for carrying out this method. Furthermore the invention is not limited to said system and method, but also relates to a computer program product for achieving the method according to the invention.

BRIEF DESCRIPTION OF DRAWINGS

Embodiment variants of the present invention will be described in the following with reference to examples. The examples of the embodiments are illustrated by the following attached figures.

MODES FOR CARRYING OUT THE INVENTION

Figure 1:
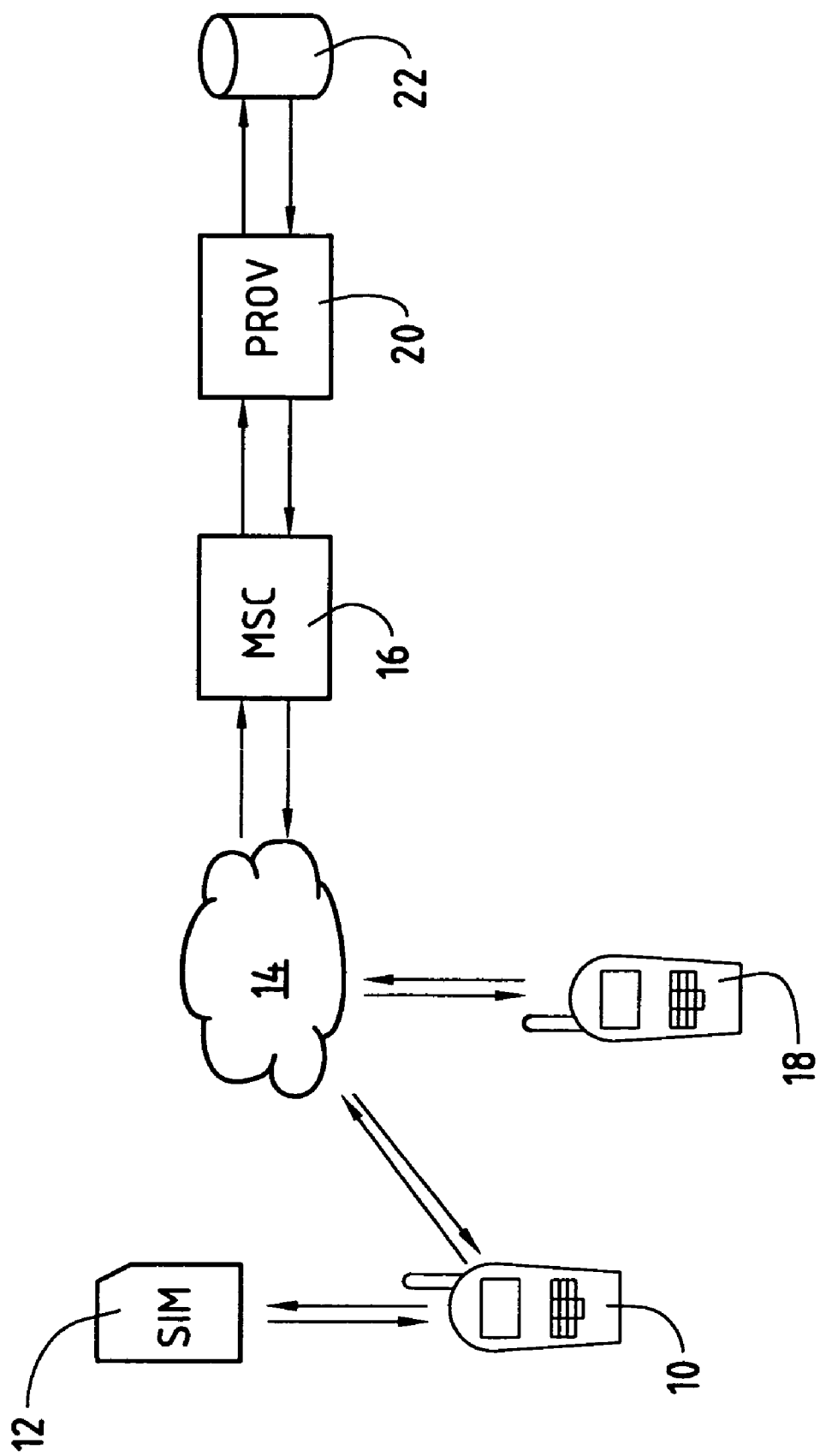
FIG. 1 shows schematically a prepaid system of the state of the art.

FIG. 1 illustrates schematically an architecture of the state of the art. Shown in this embodiment example is a mobile telephone device 10, into which a prepaid SIM card 12 is insertable. The telephone device 10 is able to be connected to the mobile radio network 14 via radio. The communication network 14 comprises, for example, a GSM (Global System for Mobile communication) or a UMTS network (Universal Mobile Telephone System), or a satellite-based mobile radio network, and/or one or more fixed networks, for instance the public switched telephone network, the worldwide Internet or a suitable LAN (Local Area Network) or WAN (Wide Area Network). In particular, it can also comprise ISDN and XDSL connections. This network, in turn, is in data exchange connection to the MSC (Mobile Switching Center) 16. The network and the MSC are structured according to the GSM standard (Global System for Mobile Communication). The desired telephone participant, who is supposed to be called using the mobile telephone 10, is designated by 18. This device can be a fixed telephone, a mobile telephone or any desired other telecommunication unit (e.g. also a fax).

A provider 20 (PROV) with a provider database 22 stays in connection with the MSC since a corresponding account center has to be available for the fees of the prepaid account to be kept. This center is located in the database 22. The data of the prepaid account in question are stored in the database 22, and are updated there upon activation of the participant account.

The course of establishment of the connection, which also includes checking the authorization (signature) and the account monitoring and updating, is generally known, and is not be described in detail.

Figure 2:
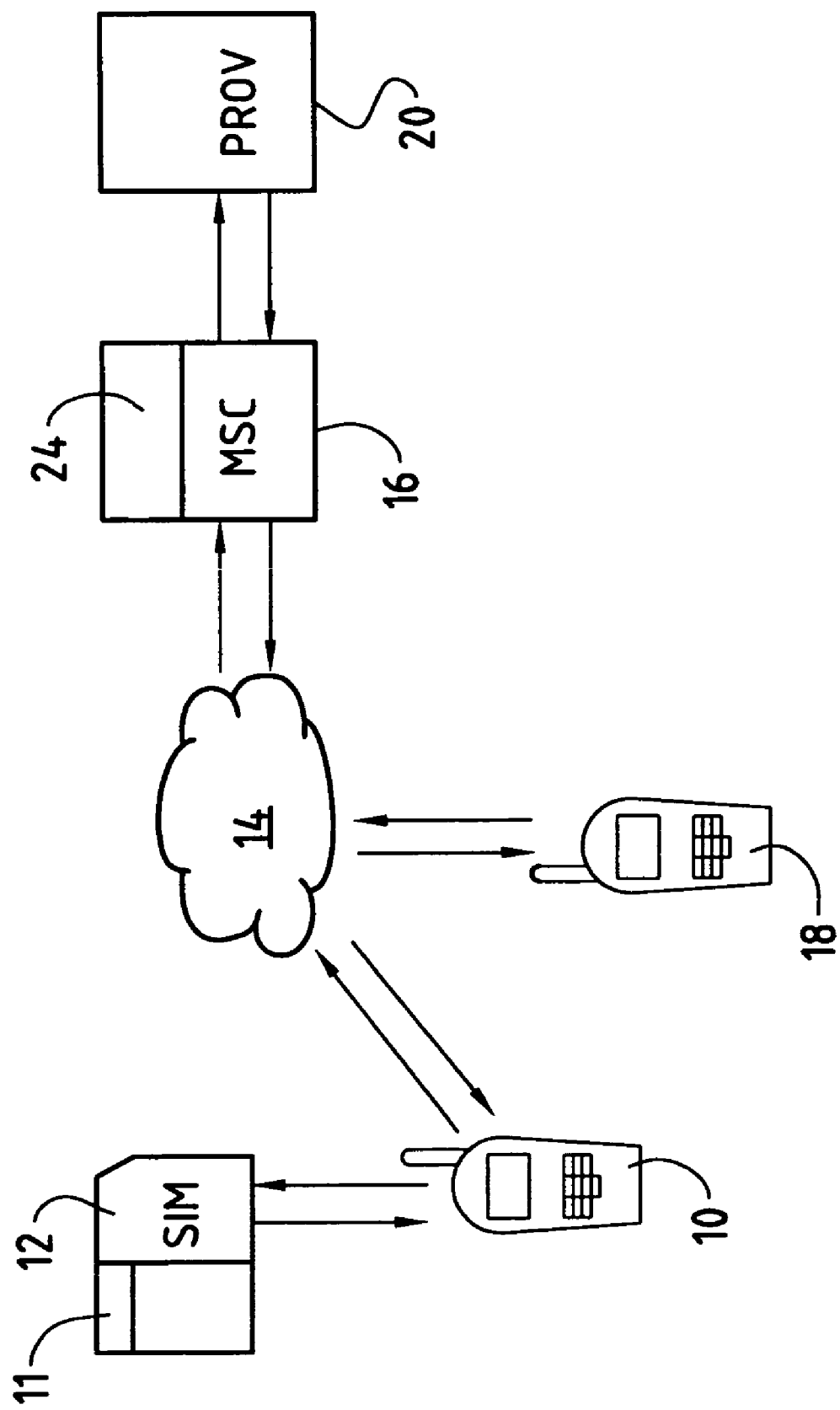
FIG. 2 illustrates schematically a system for implementing the method according to the invention.

FIG. 2 shows schematically the structure of a system according to the invention. Elements and components which are the same in FIGS. 1 and 2, or are similar to one another, bear the same reference numerals.

On the SIM card 12 there is an additional memory module 11 for storing prepaid access data, such as e.g. DRM data (DRM: Digital Rights Management), for example in encrypted form, preferably in encrypted digital form. The memory module is thereby preferably physically separate from the rest of the memory field of the SIM module 12. When loading the SIM card, for example, from a loading card set up for this purpose or from a bank credit card, the prepaid access data are transmitted, for example, via the provider 20 and the server 16 to the SIM card 12, are stored there in the memory module 11. At the same time at second key, which is assigned to the first digital key as described in the following, is stored in a control unit, for instance in a memory module 24 of an MSC (Mobile Switching Center). The SIM module grants the mobile telephone the right to carry out calls under certain conditions of use (e.g. destination, duration) using the prepaid access data, i.e. to encode, to encrypt or to sign the service data or respectively the call data by means of a first digital key of the prepaid access data. The service data can e.g. be storable (for instance SMS (Short Message Service), MMS (Multimedia Message Service), MP3 of the Moving Picture Experts Group (MPEG), etc.) and/or not storable, such as e.g. a data stream and/or voice data, etc.

When telephoning with the device 10, the sound data and/or service data are encoded, i.e. encrypted with the first digital key and/or signed and/or otherwise suitably combined, and transmitted to the MSC 16. Checked in the MSC 16, by means of a second digital key, is whether the encoded data are encoded with the first digital key. If this check is successful, the encoded service data are then decoded, i.e. decrypted and/or a signature is removed. The decoded service data are then transmitted to a second telecommunication device, for which the user of the first telecommunication device desires, or has set up, the transmission. During the transmission, any fees, which are normally a function of several parameters (duration, distance, time of day, type of device 18), are debited from control data of the prepaid access data. When the prepaid amount, the data for which are stored in the SIM module, is used up, the prepaid access data are cancelled, and the transmission is interrupted, possibly following a corresponding warning. The warning data are e.g. also stored in the control data of the prepaid access data, and are called up from there. The memory module of the SIM card can, however, also be configured such that a multiplicity of blocks with prepaid access data are storable at the same time. In this case, after a first block with prepaid access data has been cancelled, a check can be made as to whether a further block with prepaid access data is available, such a block being usable for continuation of the existing call connection.

Before reloading the data store with prepaid access data, no further transmission of service data is possible to other telecommunication devices, or only certain limited transmissions (emergency, loading numbers).

It follows from the above that the invention creates with prepaid operation a possibility of administering the telephone account directly in the mobile telephone and of avoiding the detour via a provider account. It is clear to one skilled in the art that the inventive concept and the method based thereon, claimed herein, can also be achieved with other components and system units.

The invention claimed is:

1. A method of transmitting service data between a first telecommunication device and a second telecommunication device of a telecommunication network, a central module generating prepaid access data, the prepaid access data comprising a first digital key and control data, and the prepaid access data being stored in a memory module of the first telecommunication device, and the central module generating a second digital key, assigned to the first digital key, the second digital key being stored on one or more control units of the telecommunication network, wherein the first telecommunication device determines a validity criterion based on control data of the prepaid access data, and encodes service data of the first telecommunication device by the first key, as long as the validity criterion is fulfilled, and the first telecommunication device transmits encoded service data to the control unit, the control unit checking by the second digital key that the encoded service data are encoded with the first digital key, upon a successful check the control unit decoding the encoded service data, and the control unit transmitting the decoded service data to the second telecommunication device.

2. The method according to claim 1, wherein the prepaid access data stored in the memory module of the first telecommunication device are modified and/or deleted during the encoding of service data.

3. The method according to claims 1, wherein the prepaid access data stored in the memory module of the first telecommunication device include a monetary amount value, the monetary amount value being modified and/or deleted during the encoding of service data.

4. The method according to claim 1, wherein the prepaid access data are stored on an SIM module of the first telecommunication device.

5. The method according to claim 1, wherein the encoding of the service data includes a digital encryption and/or digital signature, and the decoding of the service data includes a corresponding digital decryption and/or verification of a digital signature.

6. The method according to claim 1, wherein the prepaid access data include an authorization for the encoding of a definable quantity of service data, the prepaid access data being deleted as soon as the encoding of the definable amount of service data has been completed.

7. The method according to claim 1, wherein a multiplicity of blocks with prepaid access data are storable in the memory module of the first telecommunication device.

8. The method according to claim 1, wherein the control data comprise a multiplicity of blocks, the determination of a validity criterion as well as the modification or deletion of the corresponding block of control data being feasible for each block.

9. A system for carrying out the method according to claim 1, with a first telecommunication device, including an SIM module, with a MSC (Mobile Switching Center) connectible to the first telecommunication device via a telecommunication network, a central module comprising means for generation of prepaid access data with a first digital key and with control data and a corresponding second digital key, the SIM module of the first telecommunication device comprising means for storing the prepaid access data, and the MSC comprising means for storing the second digital key, wherein the first communication device comprises means for checking the validity criteria of prepaid access data stored in the memory module, for encoding service data of the first communication device by the first digital key and for transmitting the encoded service data to the MSC, and the MSC comprises means for checking the encoded service data by the second digital key, for decoding the encoded service data and for transmitting the service data to a second telecommunications terminal.

10. The system according to claim 9, wherein the first telecommunication device includes an encryption module or a signature module for encryption or signature of service data by the first digital key, and the MSC comprises a decryption module or a signature verification module for decryption or verification of the signature of encrypted or signed service data by the second digital key.

* * * * *